Figure 1:
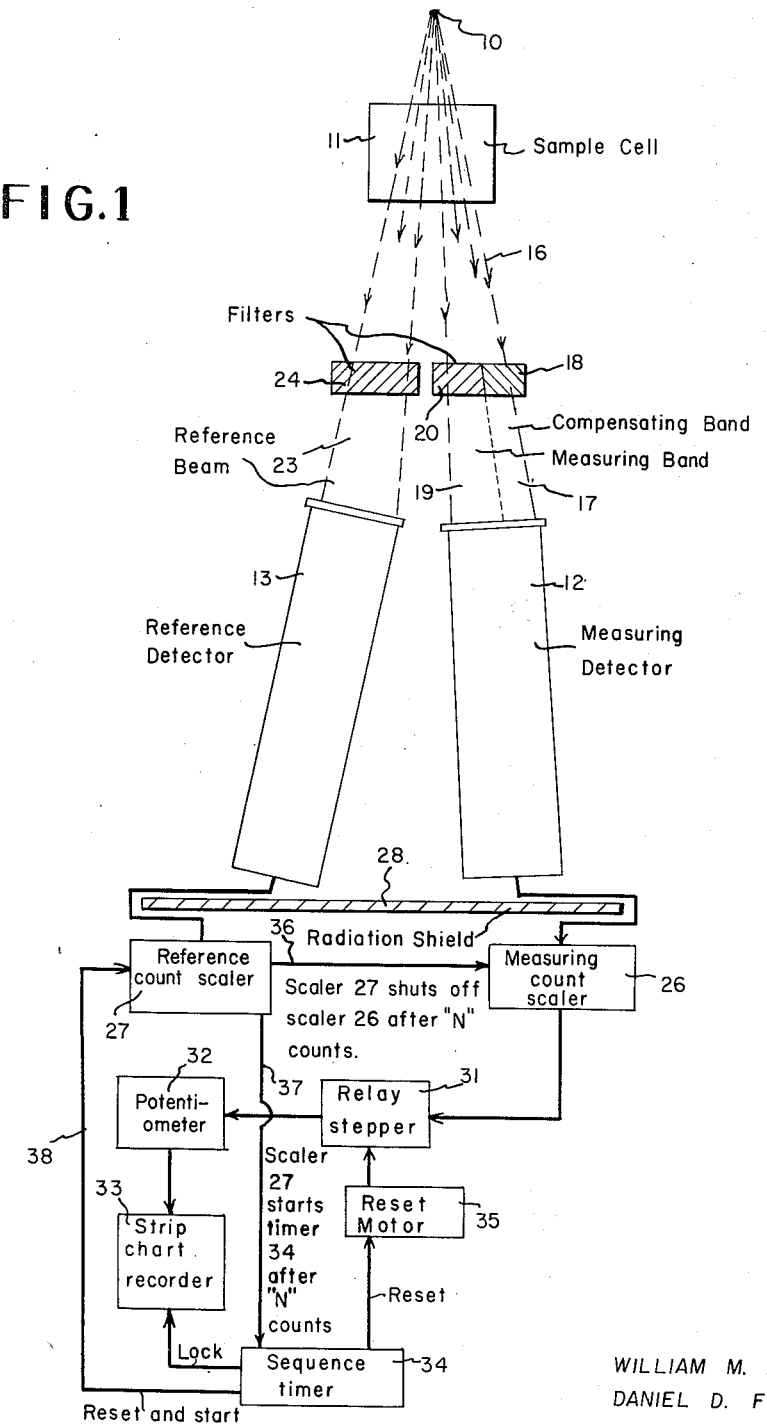

United States Patent Office 2,784,319
Patented Mar. 5, 1957

2,784,319

INTERFERENCE COMPENSATION IN X-RAY ANALYSIS

William M. Flook, Jr., and Daniel D. Friel, Greenville, Del., assignors to E. I. du Pont de Nemours and Company, Wilmington, Del., a corporation of Delaware Application July 21, 1955, Serial No. 523,573

3 Claims. (Cl. 250—43.5)

This invention relates to X-ray absorption "edge" analysis, and particularly to a method for compensating interference caused by the presence of elements other than the one being analyzed for in the course of such X-ray absorption "edge" analysis.

It is well known that absorbers for X-rays become increasingly transparent to the radiation as the wave length is lowered until, at a certain critical frequency characteristic for each specific element, the sample suddenly becomes very opaque. This phenomenon evinces itself as a discontinuity in a plot of wave length versus absorption coefficient for each element, these discontinuities being referred to as "edges." The discontinuous change in absorption is explained by the quantized structure of the atom, orbital electrons being bound to the nucleus by discrete energies, the magnitudes of which depend upon which level the particular electron occupies, i. e., K, L, M, N, etc., and upon the energy state of the electron in its orbit. Individual elements display different binding energies for specific level electrons and, therefore, require different quantities of energy to eject electrons from the specific level with accompanying ionization. When the energy of the impinging photon is increased, as by continuous bombardment by X-ray radiation, the point is reached where specific level ionization occurs, accompanied by a very large increase in absorption which results in the discontinuity known as the edge for that level, for example, the "K edge."

The absorption edge phenomenon makes possible an X-ray analyzer which is specific to a given element. Thus, if analysis of a particular material is desired, it is possible to irradiate the sample with two beams of X-rays, one of wave length slightly greater than that corresponding to the absorption edge and one of wave length slightly shorter than that corresponding to the absorption edge. Presence of the element analyzed for will then make the sample more opaque to one beam than to the other, and this unbalance can be detected by Geiger tubes, or some other suitable detector, as a function of the amount of the element present. Since each element has a characteristic absorption edge at the same invariable wave length, any other elements present will absorb both beams approximately equally and, except for the interference arising from the presence of these other materials as hereinafter described, an accurate analysis of the desired element is possible. Extensive descriptions of the theory and practice of absorption edge analysis may be found in the literature, the articles by Arne Engstrom, Acta Radiologica, Supplementum LXIII, Stockholm (1946) (in English), and H. A. Liebhafsky, Analytical Chemistry, vol. 21, p. 17 (1949), being particularly instructive.

Figure 2:
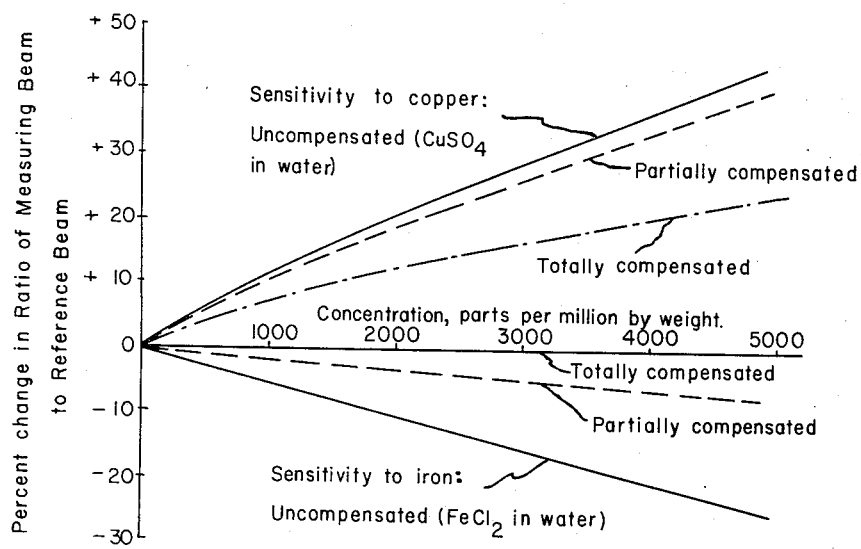

Unfortunately, elements other than the one for which analysis is desired absorb to different degrees X-ray radiation of different wave lengths. The greater the separation of the two analyzing beam wave lengths the greater is the disparity of radiation absorption between the two beams due to interferants over the usual range of the sample concentration. Since there are serious practical difficulties in monochromatizing the X-ray analytical radiation, relatively serious interference problems exist, and it is the principal object of this invention to effect a compensation for such interference which results in attainment of high analysis accuracy. Other objects of this invention include the provision of an economical, relatively simple method of interference compensation in X-ray analysis, the provision of a method of interference compensation which is effective over substantially the entire range of compositions encountered in industrial operations and provision of a method of interference compensation which is well-suited to industrial requirements in both manufacturing establishments and laboratories. The manner in which these objects is achieved will become apparent from the following detailed description and the illustrative drawings in which:

Fig. 1 is a schematic representation of one embodiment of X-ray analyzer compensated for interference according to the method of this invention, and Fig. 2 is a plot of percentage change in the ratio of the measuring beam to the reference beam over a large concentration range for uncompensated and compensated copper X-ray absorption analyzers wherein compensation is according to this invention.

Generally, the objects of this invention are attained by utilizing radiation in three different regions of wave length increasing in the order of the measuring, reference and compensating radiations, concurrently viewing the sample with two separate beams each directed at a separate radiation detector, one of the beams consisting of the measuring band together with the compensating band, while the other beam consists of the reference radiation alone, the measuring band having a wave length slightly shorter than the wave length corresponding to the absorption edge for the element being analyzed for, and the reference beam a wave length slightly longer than the wave length corresponding to the absorption edge for the element being analyzed for, while the compensating band has a relatively long wave length which is greater than the wave length of the reference beam, and preselecting the radiation intensities in the compensating and reference bands so that substantial compensation of interference due to the presence of elements in the sample other than the element analyzed for is obtained at a preselected concentration of the latter element.

X-ray radiation is absorbed to a progressively greater degree with increase in wave length, or reduction in frequency. We have found that it is possible to take advantage of this principle by utilizing a measuring beam which contains two radiation components, the compensating one of which is preselected in radiation intensity so that elements other than the sought for one will absorb from the entire measuring beam an amount of radiation which will compensate for the effect of such elements on the reference beam. Under these circumstances the ratio of the signal of the measuring detector to the signal of the reference detector will remain a function of the concentration of the substance analyzed for and will be substantially unaffected by variations in the quantities of the concentrations of the interfering substances existing in the sample.

X-ray absorption analysis is particularly adapted to the analysis of liquid process streams but, as a practical matter, it is at the present time limited to elements having a greater atomic weight than sulfur. Due to the nature of the radiation and also of X-ray absorption, it will be understood that the analysis is on an elemental basis, as distinguished from molecular, and that an appreciable time interval is required to make individual analytical determinations, since operation is by virtue of radiation counts, and certain statistical requirements have to be met to achieve acceptable accuracy. Within the foregoing limits, however, we have found that interference due to the presence of impurities can be compensated to a very high degree according to this invention.

Referring to Fig. 1, the radiation system of this invention utilizes an X-ray radiation source 10 which may be any conventional apparatus such as that utilizing impingement of a beam of high velocity electrons on a metallic target. A Machlett Type AEG–50 tube with tungsten target was satisfactory, this source being adapted to controlled setting over a voltage range of 2,500 to 50,000 volts. The voltage applied to the tube was full wave-rectified and the primary voltage, as well as the current, were regulated by conventional automatic electronic regulation equipment to a degree of the order of about 0.1%.

The output of the tube hereinabove described is polychromatic, resembling a conventional black body curve but with a definite lower limit wave length cut-off determined by the operating voltage. Radiation was directed in two separate beams through sample cell 11 to measuring detector 12 for one of the beams, and to reference detector 13 for the other beam. There is wide flexibility in the design of suitable sample cells for particular systems. For continuous analyzers it is, of course, necessary to design the cells so that a flowing stream of sample is interposed across the radiation path. The general criteria for cell design are that the cell has a definite thickness, which will depend upon the absorption coefficient of the element being detected, that the windows transmit as large a proportion of the radiation as possible and that the material of construction and the dimensions be chosen so that corrosion effects will be held to a minimum and, on the other hand, the cell will be sufficiently strong to hold the pressure imposed on it by the sample. Materials suitable for sample cell windows include, in order of preference, beryllium, polyester film backed by stainless steel screening, polyethylene, and mica. The radiation paths should preferably be kept as short as practicable since air itself is a strong absorbent to the radiation in the 4 A. region, although below about 2.5 A. air absorption no longer presents a serious problem.

This invention depends for operation upon relatively precise monochromatization of radiation in the two analyzing beams and, while several methods may be utilized for wave length control, such as "line" sources, diffraction crystals or the use of both conjointly, it is preferred to use selective filters in combination with careful voltage selection, since hard radiation emanating from the source is thereby barred and final transmission is confined to relatively narrow bands of relatively intense radiation. As hereinbefore mentioned, measuring beam 16 is regulated so that it consists of a compensating band designated 17, which is the radiation transmitted by filter 18, and a measuring band per se 19, which is the radiation transmitted by filter 20. Radiation control in reference beam 23 is achieved by the interposition thereacross of filter 24. If the three filters 18, 20 and 24 are preselected with due regard to one another, and, in addition, the two beams are masked to proportion suitably the total radiation passed to the individual detectors 12 and 13, measuring band 19 can be preselected to be adjacent the short wave length side of the analyzed material edge, reference beam 23 can be regulated to be adjacent the long wave length side of the analyzed material edge and compensating band 17 can be regulated to compensate for disproportionate interference by unwanted elements toward beam 23 over band 19. Generally, a suitable relationship of filters is to utilize a material having the atomic number A of the substance to be analyzed for filter 24 and an element having the atomic number of $A+1$ for filter 20 and of $A-1$ for filter 18.

According to this invention for the analysis of copper, the following elements were utilized with success. The sample consisted of an aqueous solution of $CuSO_4$ and the radiation utilized was in the vicinity of 1.4 A. The transmitting characteristics of available window materials are good for wave lengths in this range and it was possible to use a relatively thick sample cell in conjunction with Geiger tube detectors having mica windows of a mass of about 4 mg./sq. cm.

The radiation control in the reference beam consisted of a filter 24 made up of a .004" thickness of copper foil. Measuring beam 16 was provided with two separate filters each interposed across a portion of the beam, filter 18 consisting of a layer of 0.0021" of nickel together with a layer of 0.002" of zinc, while filter 20 consisted of a layer of 0.004" of zinc together with a layer of 0.007" of nickel. Filter 18 thereby provided the compensating band 17 of longest wave length passed to the detectors, filter 20 provided the short wave length measuring band 19 and filter 24 transmitted the other near-edge radiation, which is of intermediate wave length. It will be noted that the compensating band filter 18 was provided with a zinc foil component in addition to a nickel foil component, whereas nickel alone could be used as the filter, since the atomic number of nickel is 28, or $A-1$, as compared with the atomic numbers of copper at 29, corresponding to A, and zinc at 30, corresponding to $A+1$. The reason for utilizing the zinc foil in filter 18 was that a somewhat improved selectivity was obtained because zinc bars the passage of shorter wave lengths and passes radiation predominantly on the long side of the zinc absorption edge. The use of a nickel foil in conjunction with a zinc foil for filter 20, whereas zinc could have been used alone, was solely for the purpose of radiation attenuation, the nickel functioning merely as a neutral filter in the same way as aluminum, for example.

The efficacy of the compensation is depicted in Fig. 2 for K edge analysis, wherein the percentage change in ratio of a measuring beam to a reference beam is plotted for both a conventional uncompensated analyzer, utilizing a .005" zinc filter in the measuring beam and a .004" copper foil —.003" zinc foil filter in the reference beam, and the compensated analyzer hereinbefore described. The standard samples of copper sulfate solution were made up containing various amounts of iron in the form of ferrous chloride as impurity. It will be noted that, although the sensitivity to copper was reduced by a factor of two for the compensated analyzer, the interference due to iron was completely eliminated. Iron is recognized as being one of the worst interfering elements in the copper X-ray analyzer, therefore complete compensation for interference from this cause is indicative of what can be accomplished by the technique of this invention for other interferants.

It should be mentioned that the L-absorption edges of such elements as Os, Ir and Pt fall in the same wavelength region as that utilized in the copper analyzer which has been described and, therefore, the analyzer would be sensitive to these elements; however, under conditions usually encountered in practice there would be small possibility of such elements being present.

While the foregoing description has concerned a copper analyzer only, compensation according to this invention can be applied to the analysis of other elements as well. Thus, an iron analyzer operating at the K level Fe absorption edge of 1.730 A. was constructed utilizing an Fe foil for filter 24, an Fe foil together with a Co foil filter 20, and a Co foil together with a Mn foil filter 18. In general, a sensitivity up to about 100 p. p. m. is attainable with conventional, low cost analytical apparatus and voltage regulation devices.

The detailed description hereinbefore set forth is concerned largely with K level absorption edge analysis; however, it will be understood that this invention is equally applicable to analyses conducted at any of the other electronic energy levels and is therefore not limited in this respect. Also, conventional radiation analytical techniques may be employed to advantage in conjunction with the method of this invention. Thus, where a neutral filter is required for selective attenuation of one of the radiations over another, aluminum foil is entirely satisfactory for the purpose.

As shown in Fig. 1, one arrangement of detection apparatus which can be employed in X-ray analyzers of the type hereinbefore described, utilizes conventional count scalers 26 and 27, responsive respectively to measuring detector 12 and reference detector 13. This equipment is shielded from the X-ray source 10 by opaque barrier 28. The output from scaler 26 is fed to relay stepper 31 which operates as a mechanical ratchet to actuate a helically wound potentiomter 32 upon each multiple of net signal counts (e. g., each 64 in number). A strip chart recorder 33 responsive to potentiometer 32 traces a step chart of the analysis measured. Since indication is sequential and based on the accumulation of counts up to predetermined totals, there is included in the circuit a sequence timer 34 and a reset motor 35 for relay stepper 31.

In operation, sequence timer 34 locks strip chart recorder 33 after each record trace and actuates reset motor 35 to return relay stepper 31 to zero position. Thereafter, scaler 27 receives and accumulates a predetermined number of counts from reference detector 13, while measuring detector 12 is also counting the output in the measuring beam and actuating scaler 26. After receiving the predetermined number of counts, scaler 27 operates to stop the counting action of scaler 26 through connection 36, so that the net signal passed to relay stepper 31 is the desired ratio of counts in the measuring beam to counts in the reference beam. When scaler 27 shuts off scaler 26 it simultaneously starts timer 34 through connection 37, which initiates the recording cycle for 33. At the conclusion of a recording step, sequence timer 34 resets scaler 27 through connection 38 and the entire cycle described repeats.

From the foregoing, it will be understood that the method of interference compensation according to this invention is subject to numerous modifications without departure from the principle of the invention, wherefor it is intended to be limited only within the scope of the following claims.

What is claimed is:

1. A method for compensating for interference in X-ray absorption edge analysis comprising concurrently viewing the sample with two separate beams of radiation, one of said beams being the measuring beam and the other of said beams being the reference beam, monochromatizing complementary parts of said measuring beam to pass a compensating band of relatively long wave length and a measuring band of slightly shorter wave length than the wave length corresponding to the absorption edge for the element the analysis of which is desired to a first X-ray detector, monochromatizing said reference beam to pass radiation slightly longer in wave length than the wave length corresponding to the absorption edge of the element the analysis of which is desired, but of shorter wave length than said compensating band, to a second X-ray detector, and preselecting the intensities of radiation passed to said first detector by said compensating band and to said second detector by said reference beam so as to compensate substantially completely any interference in the net signal of said detectors arising from the presence of other elements in said sample than said element the analysis of which is desired.

2. A method for compensating for interference in X-ray absorption edge analysis comprising concurrently viewing the sample with two separate beams of radiation, one of said beams being the measuring beam and the other of said beams being the reference beam, interposing across part of said measuring beam a first radiation filter having the next lower atomic number below that of the element the analysis of which is desired to pass a compensating band to a first X-ray detector, interposing across the remainder of said measuring beam simultaneously with said first radiation filter a second radiation filter having the next higher atomic number above that of said element the analysis of which is desired to pass a measuring band to said first X-ray detector, interposing across said reference beam simultaneously with said first and second radiation filters a third radiation filter having the same atomic number as said element the analysis of which is desired to pass radiation to a second X-ray detector, and preselecting the intensities of radiation passed to said first detector through said first filter and to said second detector through said third filter so as to compensate substantially completely any interference in the net signal of said detectors arising from the presence of other elements in said sample than said element the analysis of which is desired.

3. A method for compensating for interference in the X-ray absorption edge analysis of copper according to claim 2 wherein said first filter is a nickel foil, said second filter is a zinc foil and said third filter is a copper foil.

No references cited.